US010803294B2

(12) United States Patent
Matsumura et al.

(10) Patent No.: US 10,803,294 B2
(45) Date of Patent: Oct. 13, 2020

(54) DRIVER MONITORING SYSTEM (71) Applicant: TOYOTA JIDOSHA KABUSHIKI KAISHA, Toyota-shi, Aichi-ken (JP)

(72) Inventors: Takeshi Matsumura, Numazu (JP); Jun Sato, Susono (JP); Kenichiroh Hara, Yokohama (JP); Junya Kasugai, Kakamigahara (JP); Koichiro Yamauchi, Shizuoka-ken (JP); Kazuhiro Tomosue, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 100 days.

(21) Appl. No.: 16/167,786

(22) Filed: Oct. 23, 2018

(65) Prior Publication Data

US 2019/0138790 A1 May 9, 2019

(30) Foreign Application Priority Data

Nov. 9, 2017 (JP) ................................ 2017-216602

(51) Int. Cl.
*G06K 9/00* (2006.01)
*B60W 40/08* (2012.01)
*B60W 50/14* (2020.01)

(52) U.S. Cl.
CPC ......... *G06K 9/00248* (2013.01); *B60W 40/08* (2013.01); *B60W 50/14* (2013.01); *G06K 9/00369* (2013.01); *G06K 9/00845* (2013.01); *B60W 2040/0881* (2013.01); *B60W 2050/143* (2013.01); *B60W 2520/10* (2013.01); *B60W 2540/043* (2020.02); *B60W 2552/30* (2020.02); *G06K 9/00208* (2013.01)

(58) Field of Classification Search
CPC .......................... G06K 9/00248; B60W 40/08
See application file for complete search history.

(56) References Cited

U.S. PATENT DOCUMENTS 6,393,361 B1   5/2002  Yano et al.
2009/0147993 A1*  6/2009  Hoffmann .......... G02B 27/0093
                                                    382/103

FOREIGN PATENT DOCUMENTS

JP      2000-326757 A      11/2000
JP      2012-218592 A      11/2012
JP         2016057839   *  4/2016   ............. B60K 35/00

* cited by examiner

*Primary Examiner* — Tuan H Nguyen
(74) *Attorney, Agent, or Firm* — Sughrue Mion, PLLC (57) ABSTRACT A driver monitoring system 1 includes: an image capturing device 11 which captures a face image of the driver; and a control device 50 to which the face image captured by the image capturing device is transmitted. The control device includes: a facial orientation recognition unit which recognizes the facial orientation angle of the driver based on the face image captured by the image capturing device; a zero-point setting unit which sets a zero-point of a pitch angle, yaw angle, and roll angle of the face of the driver based on the facial orientation angle recognized by the facial orientation recognition unit, when zero-point setting conditions, including that the velocity of the vehicle is equal to or greater than a predetermined velocity, are satisfied; and a state diagnosis unit that diagnoses a state of the driver based on the current facial orientation angle with respect to the zero-point set by the zero-point setting unit.

6 Claims, 6 Drawing Sheets

DRIVER MONITORING SYSTEM

TECHNICAL FIELD

The present invention relates to a driver monitoring system.

BACKGROUND ART

Driver monitoring systems provided with a camera which captures a face image of a driver, have been known. In such driver monitoring systems, for example, the direction of the face of the driver is detected based on the face image captured by the camera, and it is determined whether or not the driver is inattentive during driving, based on the detected direction of the face of the driver (for example, Patent Literature 1).

CITATION LIST

Patent Literature

[Patent Literature 1] Japanese Patent Publication (Kokai) No. 2000-326757

SUMMARY OF INVENTION

Technical Problem

In order to determine whether or not the driver is inattentive during driving based on the direction of the face of the driver, the direction of the face of the driver when facing forward is taken as a reference. When the current angle of the direction of the face relative to the reference direction is large, it is determined that the driver is inattentive while driving.

However, the direction of the face with respect to the driver monitoring camera when the driver is facing forward varies in accordance with the installation position of the driver monitoring camera, and the physique, seated posture, etc., of the driver. Thus, if a predetermined facial orientation with respect to the driver monitor camera is determined as the face orientation when facing forward, there is a possibility that it cannot be accurately recognized when the driver is facing forward. In this case, it may be determined that the driver is driving inattentively even though this is not the case. Conversely, it may be determined that the driver is not driving inattentively, despite the driver driving inattentively.

The present invention aims to solve the above problem and aims to provide a driver monitoring system which can accurately recognize the direction of the face when the driver is facing toward.

Advantageous Effect of Invention

According to the present invention, provided is a driver monitoring system which can accurately recognize the direction of the face when the driver is facing forward.

DESCRIPTION OF EMBODIMENTS

The embodiments of the present invention will be described in detail below with reference to the drawings. Note that, in the description below, the same constituent elements are assigned the same reference numerals.

First Embodiment

Configuration of the Device

Figure 1:
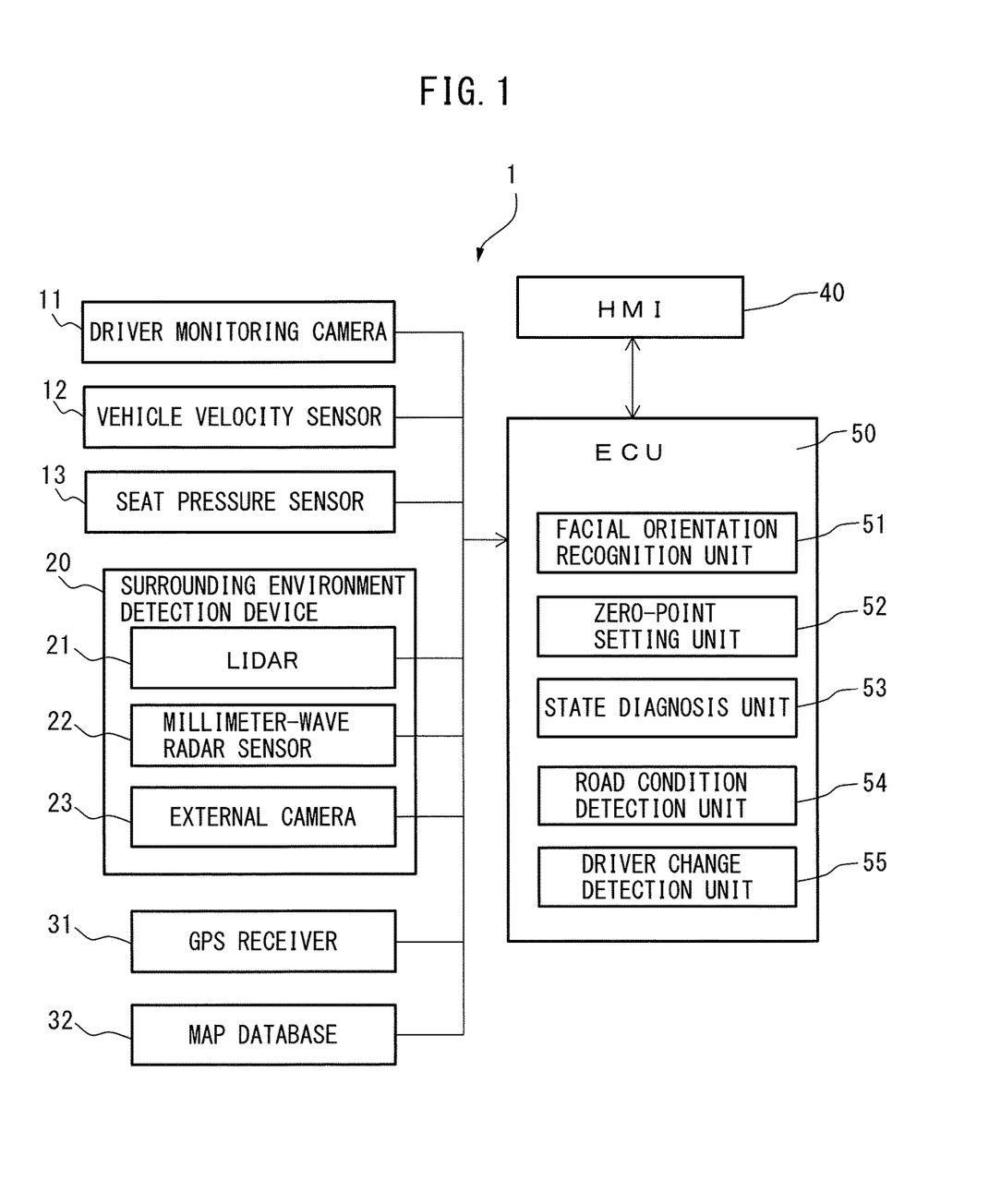
FIG. 1 is a schematic block diagram showing the configuration of the driver monitoring system.
Figure 2:
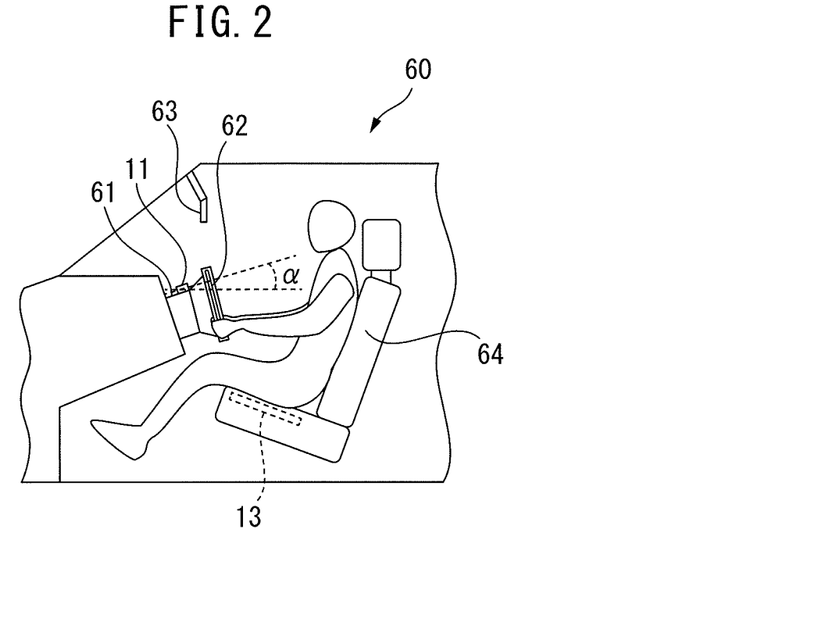
FIG. 2 is a schematic side view partially showing the inside of a vehicle equipped with the driver monitoring system.

The configuration of the driver monitoring system 1 according to an embodiment will be described with reference to FIGS. 1 and 2. FIG. 1 is a schematic block diagram showing the configuration of the driver monitoring system 1 according to the present embodiment. FIG. 2 is a schematic side view partially showing the inside of the vehicle 60 equipped with the driver monitoring system 1 according to the present embodiment.

The driver monitoring system 1 is installed in the vehicle 60 and monitors the state of the driver of the vehicle 60. As shown in FIG. 1, the driver monitoring system 1 is provided with a driver monitoring camera 11 (image capturing device) which captures a face image of the driver, a vehicle velocity sensor 12 which detects the velocity of the vehicle 60, and a seat pressure sensor 13 which detects the pressure applied to the seat surface of the driver's seat.

First, the driver monitoring camera 11 will be described with reference to FIG. 2. As shown in FIG. 2, the vehicle 60 comprises a steering wheel 62 attached via a steering column 61, a rear-view mirror 63 arranged in front of and above the driver, and a driver's seat 64 on which the driver sits.

In the present embodiment, the driver monitoring camera 11 is provided on the upper part of the steering column 61 and is arranged facing the driver so as to be able to capture the driver, specifically the face and part of the upper body of the driver. In particular, the steering column 61 is basically arranged so as to be positioned lower than the position of the face of the driver. Thus, the image capture direction of the driver monitoring camera 11 is directed upwards from the horizontal by a predetermined angle α (e.g., 10 to 20°).

Note that, as long as the driver monitoring camera 11 can capture the driver of the vehicle 60, it may be provided in a position different from the upper part of the steering column 61. For example, the driver monitoring camera 11 may be provided on the steering wheel 62, the rear-view mirror 63, the instrument panel, the instrument panel housing, etc., of the vehicle 60.

The driver monitoring camera 11 is provided with a camera and a light source. The camera may be, for example, a CMOS (complementary metal oxide semiconductor) camera or a CCD (charge coupled device) camera, and the light source may be an LED (light-emitting diode). Furthermore, in order to be able to capture the face of the driver without causing discomfort to the driver, even in low light such as at night, the light source is preferably a near-infrared LED, and the camera is also preferably capable of detecting near-infrared rays. For example, the light source may be two near-infrared LEDs arranged on both sides of the camera. Furthermore, a filter such as a visible light cut-off filter may be provided on the camera.

The driver monitoring camera 11 is connected, by wire or wirelessly, to an ECU 50, which is described later. Thus, the image captured by the driver monitoring camera 11 is transmitted to the ECU 50 as image data.

The vehicle velocity sensor 12 is a sensor for detecting the velocity of the vehicle 60. The vehicle velocity sensor 12 is, for example, attached to the housing (not shown) of the drive shaft of the vehicle to detect the rotation speed of the drive shaft of the vehicle, and detects the velocity of the vehicle 60 based on the detected rotation speed of the drive shaft. The vehicle velocity sensor 12 is connected to the ECU 50 so that the output signal of the vehicle velocity sensor 12 is transmitted to the ECU 50. Note that, as long as the vehicle velocity sensor 12 is capable of detecting the velocity of the vehicle 60, the vehicle velocity sensor 12 may be a different type of sensor attached to another part of the vehicle.

The seat pressure sensor 13 is arranged under the seat surface of the driver's seat 64. The seat pressure sensor 13 is a pressure sensor for detecting the pressure applied to the seat surface of the driver's seat 64 by the driver. In particular, in the present embodiment, when the driver's seat 64 is virtually divided into a plurality of seat surfaces, the seat pressure sensor 13 can detect the pressure applied to each divided part. In other words, the seat pressure sensor 13 can detect the pressure distribution applied to the seat surface of the driver's seat 64. The seat pressure sensor 13 is connected to the ECU 50 so that the output signal from the seat pressure sensor 13 is transmitted to the ECU 50.

Note that, as long as the seat pressure sensor 13 is capable of detecting at least the pressure applied to the entire seat surface of the driver's seat 64, the seat pressure sensor 13 may not be able to detect the pressure distribution applied to the seat surface of the driver's seat 64.

Furthermore, the driver monitoring system 1 is further provided with a surrounding environment detection device 20, a GPS receiver 31 which receives a signal from GPS satellites, and a map database 32 related to map information. All of these components are connected to the ECU 50.

The surrounding environment detection device 20 detects the environmental situation surrounding the vehicle 60 (hereinafter referred to as the "vehicle surrounding situation"). The vehicle surrounding situation includes not only the road conditions around the vehicle 60, but also obstacles, weather, etc., around the vehicle 60. In the present embodiment, the surrounding environment detection device 20 includes LIDAR (laser imaging detection and ranging) 21, a millimeter-wave radar sensor 22, and an external camera 23.

The LIDAR 21 is a device which uses laser light to detect the road and obstacles surrounding a host vehicle. The LIDAR 21 detects the status of the road and obstacles in the entire circumference of the vehicle 60, i.e., the vehicle surrounding situation as a three-dimensional image, and transmits the three-dimensional image to the ECU 50. The millimeter-wave radar sensor 22 is a device which detects obstacles surrounding a host vehicle at a distance greater than the LIDAR 21, using radio waves. The millimeter-wave radar sensor 22 transmits such measurement results to the ECU 50 as the vehicle surrounding situation. The external camera 23 is a device which photographs the area in front of the vehicle 60. The external camera 23 detects road information or the like of the area in front of the vehicle 60, by performing image processing on the captured image of the area in front of the vehicle 60. The external camera 23 transmits the detected information to the ECU 50.

The GPS receiver 31 is a device for detecting the current position of the vehicle 60 (e.g., the longitude and latitude of the vehicle 60) by receiving signals from three or more GPS satellites. The GPS receiver 31 transmits the detected current position information of the vehicle 60 to the ECU 50.

The map database 32 is a database related to map information. The map database 32 is stored in, for example, an HDD (Hard Disk Drive) mounted on the vehicle 60. The map information includes information such as, for example, information on the locations of roads, information on the shapes of roads (e.g., the types of curves and straight lines, the curvature of curves, etc.), position information on intersections and branch points, and road types.

The driver monitoring system 1 is further provided with a human machine interface (HMI) 40 and an electrical control unit (ECU) 50.

The HMI 40 is an interface for performing information input and output between the driver or vehicle occupant and the driver monitoring system 1. The HMI 40 is provided with an information provision device for providing various information to the driver, specifically, a display for displaying character information and image information, and a speaker for outputting sound. Additionally, the HMI 40 is provided with a microphone for recognizing the voice of the driver, and operation buttons or a touch panel for the input operation of the driver.

The HMI 40 is connected, by wire or wirelessly, to the ECU 50. Thus, the information input by the driver or the like is transmitted from the HMI 40 to the ECU 50. Furthermore, the information to be provided to the driver by the information provision device of the HMI 40 is transmitted from the ECU 50 to the HMI 40. For example, when it is determined by the state diagnosis unit 53 of the ECU 50, which is described later, that the driver is driving inattentively, an inattention warning command is transmitted from the state diagnosis unit 53 to the HMI 40. When such an inattention warning command is transmitted, the HMI 40, for example, generates a warning sound using the speaker, and displays on the display a warning indicating that attention should be given. Thus, the HMI 40 functions as an alarm unit that alerts the driver to abnormalities when an anomaly such as inattentiveness of the driver occurs.

The ECU 50 functions as a control device performing various controls, and is a microcomputer comprising a central processing unit (CPU), read-only memory (ROM), random access memory (RAM), an input port, and an output port, all of which are connected to each other through bidirectional busses. In the present embodiment, a single ECU 50 is provided. However, a plurality of ECUs connected to each other via busses or like conforming to CAN or the like, may be provided for each function. As shown in FIG. 1, in the present embodiment, the ECU 50 comprises a facial orientation recognition unit 51, a zero-point setting unit 52, a state diagnosis unit 53, a road condition detection unit 54, and a driver change detection unit 55.

The facial orientation recognition unit 51 recognizes the facial orientation angle of the driver, based on the face image of the driver captured by the driver monitoring camera 11. In the present embodiment, the direction of the face of the driver is represented by a pitch angle $\theta x$, a yaw angle $\theta y$, and a roll angle $\theta z$ (collectively referred to as the "facial orientation angle"). The pitch angle θx, the yaw angle θy, and the roll angle θz will be described briefly below.

Figure 3:
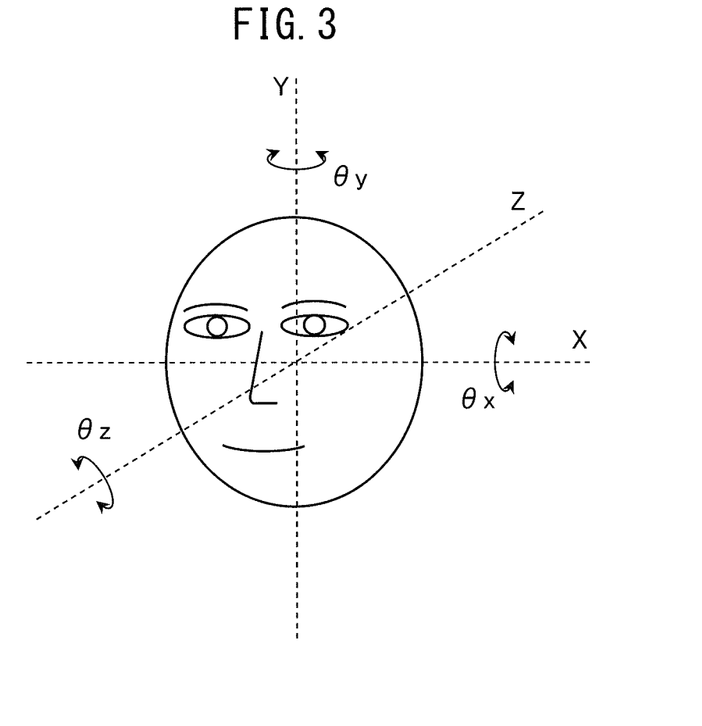
FIG. 3 is a view schematically showing the head of a driver.

FIG. 3 is a view schematically showing the face of the driver. As shown in FIG. 3, the direction of the face of the driver can be represented by angles about three mutually orthogonal axes X, Y, and Z. In the drawing, the X axis is the axis extending in the left and right directions of the face of the driver, and is the axis extending perpendicular to the direction of travel of the vehicle 60 and perpendicular to the horizontal direction. The angle θx of the face of the driver around the X axis represents the pitch angle. Thus, the pitch angle θx of the driver changes when driver faces upwards or downwards.

In the drawing, the Y axis is the axis extending in the upwards and downwards directions of the face of the driver, and is the axis extending in the vertical direction. The angle θy of the face of the driver around the Y axis represents the yaw angle. Thus, the yaw angle θy of the driver changes when the driver turns his/her head toward left or right.

In the drawing, the Z axis is the axis extending in the forwards and backwards directions of the face of the driver, and is the axis extending in the direction of travel of the vehicle 60. The angle θz of the face of the driver around the Z axis represents the roll angle. Thus, the roll angle θz of the driver changes when the driver inclines his/her head.

Figure 4:
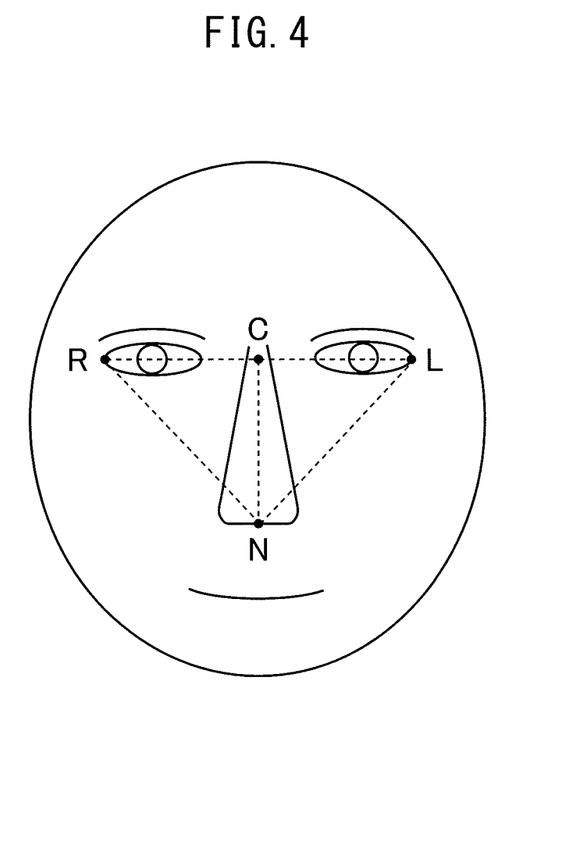
FIG. 4 is a view showing feature points used to recognize the facial orientation angle of the driver.

Next, the specific method for recognizing the facial orientation angle of the driver by the facial orientation recognition unit 51 will be described with reference to FIG. 4. FIG. 4 is a view showing feature points used to recognize the facial orientation angle of the driver.

The facial orientation recognition unit 51, when recognizing the face direction of the driver, first extracts feature points of the face from the face image. In the present embodiment, the facial orientation recognition unit 51 extracts the outer ends of the eyes and the tip of the nose as feature points from the face image of the driver captured by the driver monitoring camera 11. Specifically, the facial orientation recognition unit 51 extracts, as shown in FIG. 4, the outer end L of the left eye (the left side end), the outer end R of the right eye (the right-side end), and the tip N of the nose. As shown in FIG. 4, the intersection between the line, passing through point N, normal to the line segment LR (the line segment connecting the outer ends of the left and right eyes) and the line segment LR is extracted as feature point C.

The facial orientation recognition unit 51 recognizes the facial orientation angle of the driver, based on the features points extracted in this way. First, regarding the pitch angle θx, the ratio of the length of line segment CN to the length of line segment LR (hereinafter referred to as the "CN/LR ratio") becomes smaller as a change in the direction of the face of the driver with respect to the state facing the driver monitoring camera 11 increases. Thus, when the driver monitoring camera 11 is oriented by a certain degree from the horizontal as in the present embodiment, the CN/LR ratio decreases as the direction of the face of the driver faces upwards. Therefore, in the present embodiment, the facial orientation recognition unit 51 detects the pitch angle θx of the face of the driver based on the CN/LR ratio.

Furthermore, the pitch angle θx at this time is provisionally calculated, using, for example, the direction in which the face of the driver faces the driver monitoring camera 11 in the upward and downward directions (pitch angle direction) as a provisional reference (i.e., the direction in which the CN/LR ratio is maximum). Thus, when the face of the driver faces the driver monitoring camera 11 in the pitch angle direction, the pitch angle is provisionally calculated assuming that the pitch angle of the face of the driver is 0°. Below, the provisional pitch angle calculated in this way based on the provisional reference, is referred to as the provisional pitch angle θx'. Note that the provisional reference for calculating the provisional pitch angle need not necessarily be the direction in which the face of the driver faces the driver monitoring camera 11, but can be set to any direction.

Further, regarding the yaw angle θy, in the state in which the face of the driver faces towards the driver monitoring camera 11, the ratio of line segment LC to line segment RC (hereinafter referred to as the "RC/LC ratio") is approximately 1. When the driver's face turns from this state to the right, since line segment RC becomes short, the RC/LC ratio becomes smaller than 1. Further, when the driver's face turns from this state to the left, since line segment LC becomes short, the RC/LC ratio becomes greater than 1. Therefore, in the present embodiment, the facial orientation recognition unit 51 calculates the yaw angle θy based on the RC/LC ratio.

Furthermore, the yaw angle θy at this time is provisionally calculated, using, for example, the direction in which the RC/LC ratio becomes 1 as a provisional reference. Thus, when the RC/LC ratio becomes 1, the yaw angle is provisionally calculated assuming that the yaw angle of the face of the driver is 0°. Below, the provisional yaw angle calculated in this way based on the provisional reference is referred to as the provisional yaw angle θy'. Note that the provisional reference for calculating the provisional yaw angle need not necessarily be the direction in which the RC/LC ratio becomes 1, but can be set to any direction.

Further, regarding the roll angle θz, when the direction of the face of the driver is tilted, the angle of line segment RL (hereinafter referred to as "the angle of line segment RL") with respect to the horizontal line of the driver monitoring camera 11, changes. Therefore, in the present embodiment, the facial orientation recognition unit 51 calculates the roll angle θz of the driver, based on the angle of line segment RL with respect to the horizontal line of the driver monitoring camera 11.

Furthermore, the roll angle θz at this time is provisionally calculated, using, for example, the direction in which the angle of line segment RL is 0° as a provisional reference. Thus, when the angle of line segment RL is 0°, the roll angle is provisionally calculated assuming that the roll angle of the face of the driver is 0°. Below, the provisional roll angle calculated in this way based on the provisional reference is referred to as the provisional roll angle θz'. Note that the provisional reference for calculating the provisional roll angle need not necessarily be the direction in which the angle of line segment RL is 0°, but can be set to any direction.

Note that in the example shown in FIG. 4, the facial orientation recognition unit 51 extracts three feature points based on the face image captured by the driver monitoring camera 11, and recognizes the facial orientation angle of the driver based on these feature points. However, the facial orientation recognition unit 51 may be configured so as to recognize the facial orientation angle of the driver by another method. Thus, the facial orientation recognition unit 51 may be configured so as to recognize the facial orientation angle of the driver based on, for example, a greater number of feature points, or may be configured to fit (match) the face image to a 3D model and recognize the facial orientation angle using this 3D model. In either case, the provisional pitch angle θx', provisional yaw angle θy', and provisional roll angle θz' (collectedly referred to as the "provisional facial orientation angle θ'") are calculated by the facial orientation recognition unit 51 based on the provisional reference.

The zero-point setting unit 52 sets the zero-point of the facial orientation angle. The zero-point is set so that the pitch angle θx, the yaw angle θy, and the roll angle θz are all 0° when the driver is facing forward.

For example, when considering the pitch angle direction, the provisional pitch angle θx' does not necessarily become 0° when the driver is facing forward. Therefore, the zero-point setting unit 52 sets the zero-point of the pitch angle so that the pitch angle θx when the driver is facing forward is 0°. Thus, when the provisional pitch angle θx' is a certain angle, setting of the zero-point of the pitch angle is performed assuming that the pitch angle θx is 0°. For example, if the provisional pitch angle θx' is 15° when the driver is facing forward, the zero-point of the pitch angle of the face of the driver is set in a state in which the provisional pitch angle θx' is 15°.

The same is true for the yaw angle direction and the roll angle direction. Thus, the zero-point setting unit 52 sets the zero-point of the yaw angle such that the yaw angle θy when the driver is facing forward is 0° and sets the zero-point of the roll angle so that the roll angle θz when the driver is facing forward is 0°.

The state diagnosis unit 53 diagnoses the state of the driver, based on the current facial orientation angle with respect to the zero-point set by the zero-point setting unit 52. As described above, the zero-point is set so that the pitch angle θx, the yaw angle θy, and the roll angle θz are all 0° when the driver is facing forward. Thus, for example, during operation of the vehicle 60, when the absolute values of the pitch angle θx and the yaw angle θy with respect to zero-point are greater than a predetermined reference value over a predetermined time or longer, the state diagnosis unit 53 determines that the driver is driving inattentively. Furthermore, during operation of the vehicle 60, when the roll angle θz with respect to the zero-point is greater than a predetermined reference value over a predetermined time or longer, the state diagnosis unit 53 determines that an abnormality has occurred in the driver.

The road condition detection unit 54 detects the condition of the road on which the vehicle 60 is travelling. The road condition detection unit 54 may detect the road condition based on the vehicle surrounding situation detected by the surrounding environment detection device 20 or may detect the road condition based on the current position detected by the GPS receiver 31 and the map information of the map database 32. The road conditions detected by the road condition detection unit 54 include, for example, whether or not the road on which the vehicle 60 is travelling is a straight road, and if it is a curve, the radius of curvature of the road, and additionally, the inclination angle of the road on which the vehicle 60 is travelling.

The driver change detection unit 55 detects a change in the posture of the driver or a change of driver. The driver change detection unit 55 detects a change in driver based on, for example, the pressure of the seat pressure sensor 13. Specifically, for example, when the pressure detected by the seat pressure sensor 13 temporarily becomes zero and then becomes a certain value again, the driver change detection unit 55 determines that the driver has changed or that the posture of the driver has changed. Furthermore, when the distribution in pressure detected by the seat pressure sensor 13 changes without becoming zero, the driver change detection unit 55 determines that the posture of the driver has changed.

Note that the driver change detection unit 55 may detect a change in driver based not on the seat pressure sensor 13, but rather on the output of another detection device. Thus, for example, the driver change detection unit 55 may detect a change in driver based on the image captured by the driver monitoring camera 11.

Problems with Zero-Point Setting

The zero-point, in which the above-described facial orientation angle is zero, can be set to a predetermined fixed value. For example, a provisional reference (fixed value) for calculating the provisional pitch angle θx' can be set in advance as the zero-point of the pitch angle θx, and a provisional reference (fixed value) for calculating the provisional yaw angle θy' can be set in advance as the zero point of the yaw angle θy.

However, if the zero-point of pitch angle θx or the zero-point of the yaw angle θy are set as fixed values, it may not be possible to accurately recognize when driver is facing forward.

For example, the position of the face of the driver with respect to the driver monitoring camera 11 differs between when the driver is driving while leaning forward and when the driver is sitting far back in the driver's seat 65. As a result, therebetween, the direction of the face of the driver with respect to the driver monitoring camera 11 is different when driver is facing forward. Furthermore, the position of the face of the driver with respect to the driver monitoring camera 11 differs for a driver having a high sitting height and a driver having a low sitting height. As a result, the direction of the face of the driver with respect to the driver monitoring camera 11 when the driver is facing forward differs between the two. Thus, the direction of the face with respect to the driver monitoring camera varies according to the installation position of the driver monitoring camera, and the physique, the seated posture, etc., of the driver. Furthermore, the CN/LR ratio, the RC/LC ratio, and the angle of line segment RL when the driver is facing forward, differ depending on the composition of the face of the driver. Thus, the provisional pitch angle θx', the provisional yaw angle θy', and the provisional roll angle θz' when the driver faces forward are different values.

If it cannot be accurately recognized when the driver is facing forward, the state diagnosis unit 53 may determine the pitch angle, yaw angle, etc., of the face of the driver, based on a case in which the driver is not facing forward. As a result, the state diagnosis unit 53 may determine that the driver is driving inattentively, etc., when the driver is not driving inattentively, or conversely, may determine that the driver is not driving inattentively, etc., when the driver is driving inattentively.

Setting of the Zero-Point

In the present embodiment, the zero-point setting unit 52 sets the zero-point of the pitch angle, yaw angle, and roll angle of the face of the driver (i.e., the facial orientation angle), based on the facial orientation angle of the driver recognized by the facial orientation recognition unit 51 when zero-point setting conditions have been established.

In the present embodiment, the zero-point setting conditions include that the velocity of the vehicle is higher than a predetermined reference velocity greater than 0. Thus, the zero-point setting unit 52 sets the zero-point, based on the face direction of the driver recognized by the facial orientation recognition unit 51 when the velocity of the vehicle is higher than the predetermined reference velocity greater than 0. It is preferable that the reference velocity be a velocity at which the frequency at which the driver is inattentive is reduced, for example, greater than or equal to 20 kmph, preferably greater than or equal to 40 kmph, and more preferable greater than 60 kmph.

Furthermore, in the present embodiment, the zero-point setting conditions include that the road condition detection unit 52 detects that the vehicle 60 is travelling on a straight road having no inclination. Thus, the zero-point setting unit 52 sets the zero-point, based on the face direction of the driver recognized by the facial orientation recognition unit 51 when the vehicle 60 is travelling on a straight road having no inclination.

The roads with no inclination include, in addition to the road which is not inclined at all with respect to the horizontal within the range that the driver can see, roads that are not substantially inclined within a range that the driver can see, for example, roads having an inclination angle of less than or equal to 0.5° with respect to the horizontal. Furthermore, straight road means a road extending linearly in a range visible to the driver.

Specifically, in the present embodiment, the zero-point of the pitch angle, yaw angle, and roll angle of the face of the driver are set based on the provisional pitch angle $\theta x'$, the provisional yaw angle $\theta y'$, and the provisional roll angle $\theta z'$, respectively, recognized by the facial orientation recognition unit 51 when the zero-point setting conditions have been established.

In particular, in the present embodiment, the zero-point setting unit 52 acquires the face direction of the driver, i.e., the provisional pitch angle $\theta x'$, the provisional yaw angle $\theta y'$, and the provisional roll angle $\theta z'$, continuously over a predetermined period. The average value of the provisional pitch angles $\theta x'$, the average value of the provisional yaw angles $\theta y'$, and the average value of the provisional roll angles $\theta z'$, acquired in this way over the predetermined period, are set as the zero-point of the pitch angle, the yaw angle, and the roll angle, respectively. The predetermined period is a period long enough to avoid errors in the setting of the zero-point, for example, from 10 seconds to five minutes, preferably from 30 seconds to 3 minutes, and more preferably from 1 minute to two minutes.

Furthermore, in the present embodiment, the setting of the zero-point is performed at the following timings. Thus, the following timings are also one of the zero-point setting conditions.

The first timing may be when the setting of the zero-point of the facial orientation angle by the zero-point setting unit 52 has not yet been performed after the ignition switch of the vehicle 60 has been changed from "OFF" to "ON". When the ignition switch is changed to "ON", it is highly likely that the driver and the posture of the driver have changed since the vehicle was last operated, and when the driver and the posture thereof have changed, it is highly likely that zero-point has also changed accordingly. Thus, by setting the zero-point at this timing, the zero-point can be matched to the new driver or the new posture of the driver.

The second timing may include when the time elapsed since the setting of the zero-point was last performed is longer than a predetermined period or when the distance travelled since the setting of the zero-point was last performed is longer than a predetermined distance. In general, it is highly likely that the posture of the driver will change after having driven for a long time or a long distance. Thus, by setting the zero-point at such timing, the zero-point can be matched with the posture after the change in the driver.

The third timing may include when the driver change detection unit 55 detects a change in the driver (i.e., a change in driver or a change in the posture of the driver, etc.). As described above, it is highly likely that when the driver or the posture thereof change, the zero-point will also change. Thus, by performing setting of the zero-point at this timing, the zero-point can be matched with the new driver or the new posture.

Mode of Operation and Effect

Next, the mode of operation and effect of the driver monitoring system 1 according to the present embodiment will be described.

When the vehicle 60 is stopped, the driver is often not looking forward and is inattentive. Thus, if setting of the zero-point of the facial orientation angle of the driver is performed when the vehicle 60 is stopped, there is a risk that the facial orientation angle of the driver when the driver is not facing forward will be set as the zero-point. Conversely, in the driver monitoring system 1 of present embodiment, the setting of the zero-point is performed, based on the facial orientation angle of the driver recognized by the facial orientation recognition unit 51 when the velocity of the vehicle is equal to or greater than the reference velocity. As a result, according to the driver monitoring system 1 of the present embodiment, the zero-point can be set as the facial orientation angle of the driver when the driver is facing forward.

Furthermore, when the front of the vehicle 60 is upwardly or downwardly inclined, the driver often faces upwards or downwards toward the direction of inclination. Thus, if the vehicle 60 is travelling on an inclined road, the face of the driver may not be facing forward (in particular, in the pitch angle direction). Conversely, in the driver monitoring system 1 of the present embodiment, the setting of the zero-point is performed based on the facial orientation angle of the driver recognized by the facial orientation recognition unit 51 when the vehicle 60 is travelling on a road having no inclination. As a result, according to the driver monitoring system 1 of the present embodiment, a more accurate zero-point of the facial orientation angle of the driver (in particular, the pitch angle) can be set.

Additionally, when the road in front of the vehicle 60 is curved, the driver is likely to face the turning direction in accordance with the curve. Thus, when the vehicle 60 is travelling on a curved road, the face of the driver sometimes is not facing forward (in particular, the yaw angle direction). Conversely, in the driver monitoring system 1 of the present embodiment, the setting of the zero-point is performed based on the facial orientation angle of the driver recognized by the facial orientation recognition unit 51 when the vehicle 60 is travelling on a straight road. As a result, according to the driver monitoring system 1 of the present embodiment, a more accurate zero-point of the facial orientation angle of the driver (in particular, the yaw angle) can be set.

Further, in the present embodiment, the average values of the provisional pitch angle $\theta x'$, etc., acquired over a predetermined period are set as the zero-point of the pitch angle, etc., instead of the provisional pitch angle $\theta x'$, etc., acquired at an instantaneous timing. Thus, it is possible to set the zero-point relatively accurately even under circumstances in which the driver notices obstacles or the like on the road and thus temporarily does not face forward.

Modification of the First Embodiment

Note that, in the present embodiment, the zero-point setting unit 52 sets the zero-point regarding all of the pitch angle, the yaw angle, and the roll angle of the face of the driver based on the facial orientation angle of the driver when the zero-point setting conditions have been established. However, it is not necessary that the zero-point setting unit 52 set the zero-point for all of the pitch angle, the yaw angle, and the roll angle of the face of the driver, but may set the zero-point of the facial orientation angle including at least any one of the pitch angle, the yaw angle, and the roll angle of the face of the driver.

Furthermore, in the above-described embodiment, the zero-point setting conditions include that the vehicle 60 is travelling on a straight road having no inclination. However, such conditions need not necessarily be included as zero-point setting conditions. Alternatively, the zero-point setting conditions may include only that the vehicle 60 is travelling on a road having no inclination or that the vehicle 60 is travelling on a straight road.

Further, in the above-described embodiment, the setting of the zero-point is performed based on the average values of the provisional pitch angle θx', etc., acquired at a predetermined period. However, it is not necessary to use the average values of the provisional pitch angle θx', etc., acquired over a predetermined period to set the zero-point. For example, the setting of the zero-point may be performed based on the provisional pitch angle θx', etc., acquired at a single time point, or the setting of the zero-point may be performed based on the peaks of the frequency distributions of the provisional pitch angle θx', etc., acquired over a predetermined period.

Furthermore, when performing the setting of the zero-point of the pitch angle, the zero-point setting conditions may include that the absolute value of the current yaw angle be within a predetermined angle (e.g., 15°), which is determined in advance. In other words, if the driver is facing sideways, the facial orientation recognition unit 51 may not be able to accurately calculate the provisional pitch angle θx'. Therefore, if the setting of the zero-point is performed in a state in which the driver is facing sideways, there is a risk that the zero-point of the pitch angle will not be set correctly. Thus, when the absolute value of the current yaw angle is within the predetermined angle, which is determined in advance, the setting of the zero-point of the pitch angle can be accurately performed.

Flowchart

Figure 5:
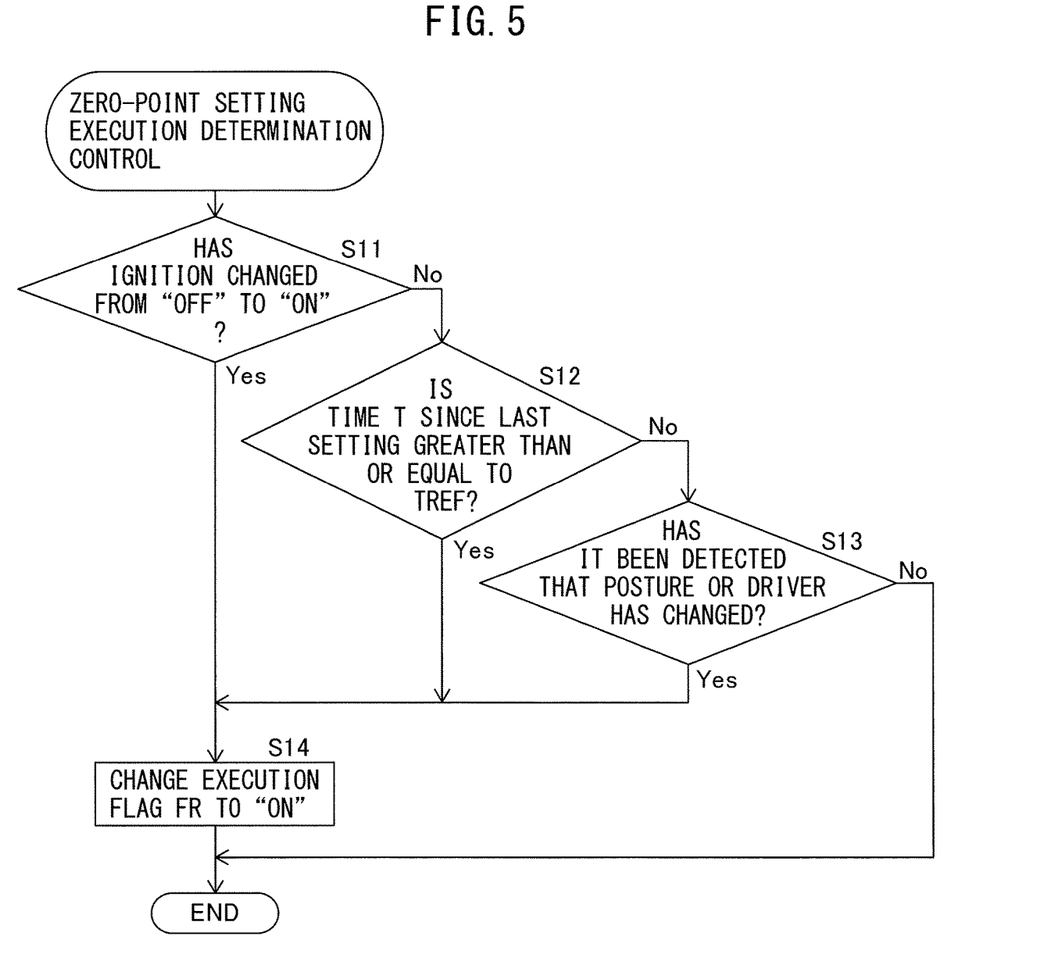
FIG. 5 is a flowchart showing the control routine for determining the execution timing of zero-point setting.

FIG. 5 is a flowchart showing the control routine for determining the execution timing of the setting of the zero-point. The illustrated control routine is repeatedly executed at constant time intervals.

As shown in FIG. 5, first, in step S11, it is determined whether or not the ignition switch of the vehicle 60 has been switched from "OFF" to "ON". When it is determined that the ignition switch has been switched to "ON", the routine proceeds to step S14. When it is determined that the ignition switch has not been changed to "ON", the routine proceeds to step S12.

In step S12, it is determined whether or not the elapsed time T from the previous performance of the setting of the zero-point is equal to or greater than a predetermined reference time Tref. When it is determined that the elapsed time T is greater than or equal to the reference time Tref, the routine proceeds to step S14. When it is determined that the elapsed time T is less than the reference time Tref, the routine proceeds to step S13.

In step S13, it is determined whether or not a change in the driver, i.e., change in the posture of the drier or a change of driver has been detected by the driver change detection unit 55. When it is determined that a change in the driver has been detected in step S13, the routine proceeds to step S14. Conversely, when it has been determined that a change in driver has not been detected, the control routine ends.

In step S14, the execution flag Fr of the setting of the zero-point is set to "ON", and the control routine ends. The execution flag FR is set to "ON" when the setting of the zero-point is to be performed and is set to "OFF" otherwise.

Figure 6:
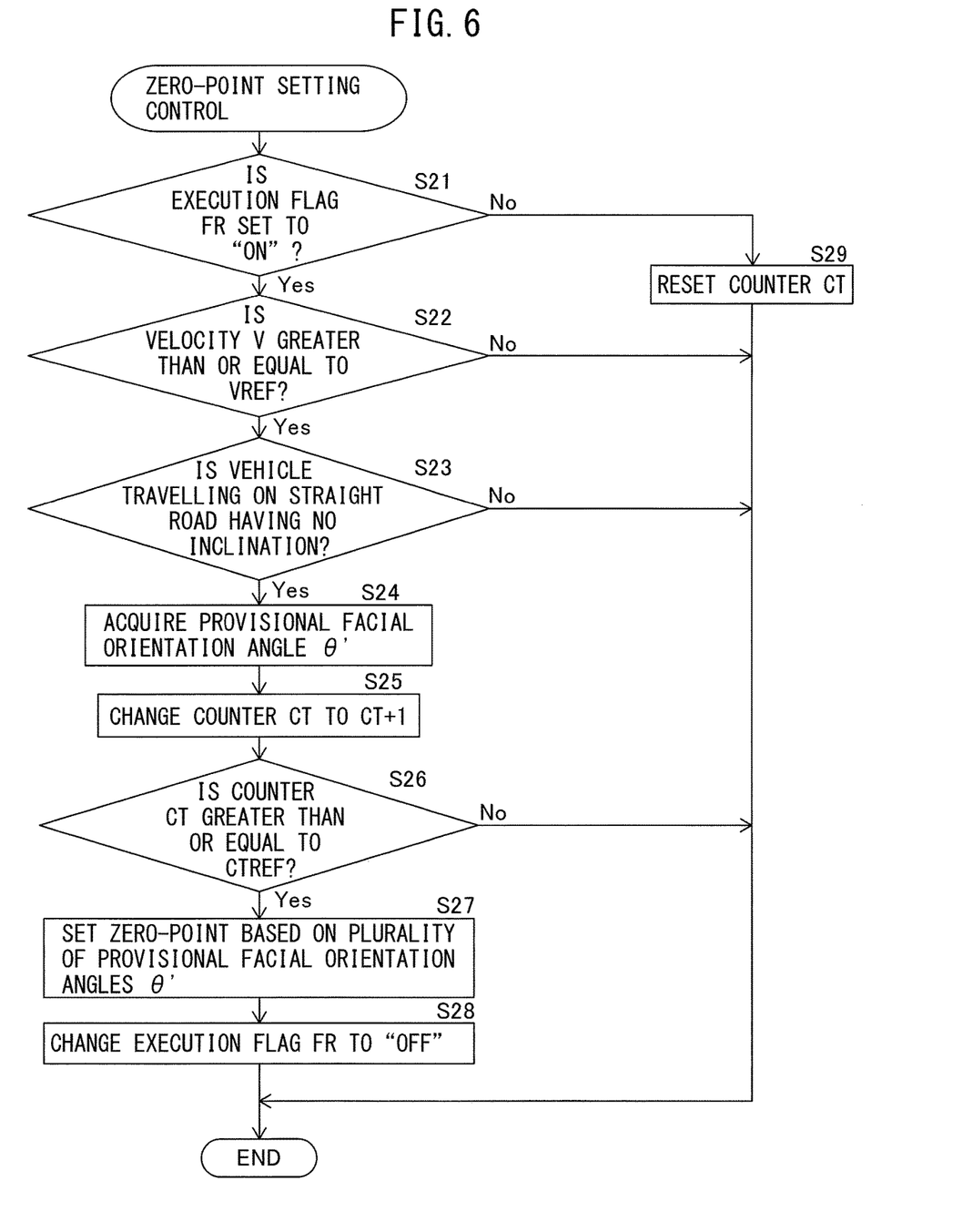
FIG. 6 is a flowchart showing the control routine for setting the zero-point of the facial orientation angle of the driver.

FIG. 6 is a flowchart showing the control routine for setting the zero-point of the facial orientation angle of the driver. The illustrated control routine is repeatedly executed at constant time intervals.

As shown in FIG. 6, first, in step S21, it is determined whether or not the execution flag Fr of the setting of the zero-point has been set to "ON". If the execution flag Fr has been set to "ON" in step S14 of FIG. 5, it is determined in step S21 that the execution flag Fr has been set to "ON", and the routine proceeds to step S22.

In step S22, it is determined whether or not the velocity V of the vehicle 60 detected by the vehicle velocity sensor 12 is greater than or equal to a predetermined reference velocity Vref. When it is determined in step S22 that the velocity V of the vehicle 60 is less than the reference velocity Vref, the control routine ends. When it is determined in step S22 that the velocity V of the vehicle 60 is greater than or equal to the reference velocity Vref, the routine proceeds to step S23.

In step S23, it is determined whether or not it has been detected by the road condition detection unit 54 that the vehicle 60 is travelling on a straight road having no inclination. When it is determined that the vehicle 60 is not travelling on a straight road having no inclination, the control routine ends. Conversely, when it is determined in step S23 that the vehicle 60 is travelling on a straight road having no inclination, the routine proceeds to step S24. In step S24, the provisional facial orientation angle θ' (i.e., the provisional pitch angle θx', the provisional yaw angle θy', and the provisional roll angle θz') is acquired.

Next, in step S25, the value obtained by adding 1 to the current value of a counter CT is set as a new value of the counter CT. The counter CT is a counter indicating the elapsed time since the acquisition of the provisional facial orientation angle θ' has begun. Next, in step S26, it is determined whether or not the counter CT is greater than or equal to a reference value CTref. When it is determined in step S26 that the counter CT is less than the reference value CTref, the control routine ends. Conversely, when it is determined in step S26 that the counter CT is greater than or equal to the reference value CTref, the routine proceeds to step S27.

In step S27, the zero-point of the facial orientation angle of the driver is set (updated), based on the provisional facial orientation angle θ' acquired a plurality of times in step S24. Specifically, the average value of the provisional facial orientation angles θ' is set as the zero-point of the facial orientation angle θ. Next, in step S28, the execution flag Fr is reset to "OFF", and the control routine ends.

On the other hand, when it is determined in step S21 that the execution flag Fr has been set to "OFF", the routine proceeds to step S29. In step S29, the counter CT is reset to zero and the control routine ends.

Second Embodiment

Figure 7:
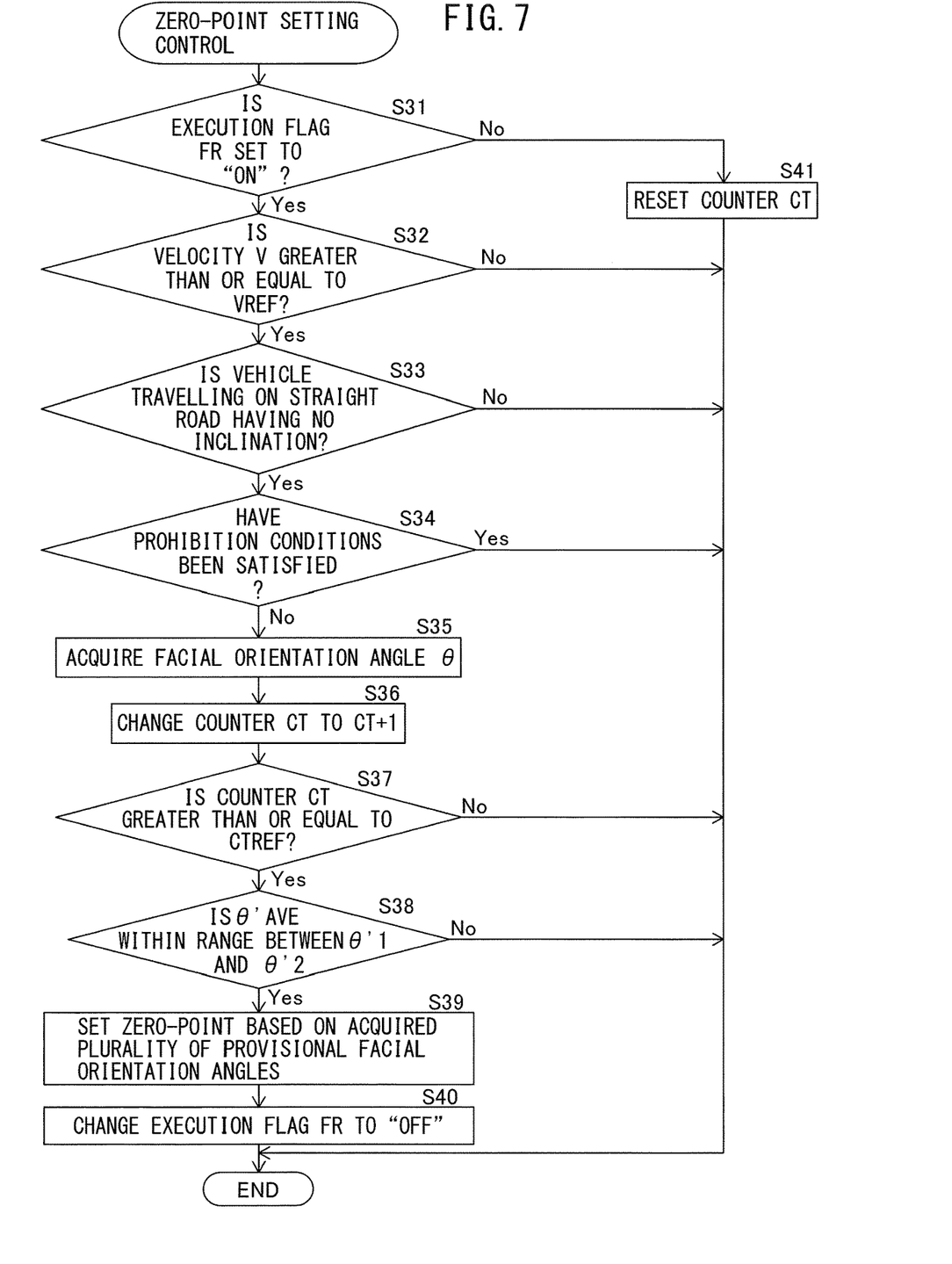
FIG. 7 is a flowchart showing the control routine for setting the zero-point of the facial orientation angle of the driver according to a second embodiment.

Next, the driver monitoring system 1 according to a second embodiment will be described with reference to FIG.

7. The configuration and control of the driver monitoring system according to the second embodiment is substantially the same as the configuration and control of the driver monitoring system according to the first embodiment. The points of difference from the driver monitoring system of the first embodiment will be mainly described below.

When the driver operates the switches of the vehicle 60, it is likely that the driver is looking toward the switches. Thus, even if the above-described zero-point setting conditions are established, for example, when the driver is operating the switches of the vehicle 60, it is highly likely that the driver is not facing forward.

In the present embodiment, when prohibition conditions, such that the operation of the switches in the vicinity of the driver is detected, are established, even if the zero-point setting conditions are established, setting the of zero-point is prohibited. In particular, in the present embodiment, at such a time, acquisition of the provisional facial orientation angle $\theta'$ from the facial orientation recognition unit 51 by the zero-point setting unit 52 is stopped.

Furthermore, the provisional facial angle $\theta'$ when the driver is facing forward is essentially within a predetermined range (reference angle range). For example, the provisional yaw angle $\theta y'$ when the driver is facing forward essentially falls within the range of about $-10°$ to about $10°$. Thus, the average value of the provisional yaw angles $\theta y'$ calculated for the setting of the zero-point (i.e., the average value of the provisional yaw angles $\theta y'$ during the above-mentioned constant period) should be within this range.

In the present embodiment, when the average value of the provisional yaw angles $\theta y'$ calculated for the setting of the zero-point is not within the reference angle range, the setting of the zero-point is prohibited. Likewise, when the average value of the provisional pitch angles $\theta x'$ calculated for the setting of the zero-point is not within the reference angle range and the average value of the provisional roll angles $\theta z'$ calculated for the setting of the zero-point is not within the reference angle range, the setting of the zero-point is prohibited. In other words, in the present embodiment, when the provisional facial orientation angle $\theta'$ calculated for the setting of the zero-point is not within the reference angle range, which is set in advance, the setting of the zero-point of the facial orientation angle is prohibited. The reference angle range is set to a range which the facial orientation angle may normally take when the driver is facing forward.

FIG. 7 is a flowchart showing the control routine for the setting of the zero-point of the facial orientation angle of the driver in the second embodiment. The illustrated control routine is repeatedly executed at constant time intervals. Note that steps S31 to S33, S35 to S37 and S39 to S41 in FIG. 7 are similar to steps S21 to S29 in FIG. 6, respectively, and thus an explanation thereof has been omitted below.

In step S34, it is determined whether or not the prohibition conditions have been established. The prohibition conditions are established, for example, when the driver is operating the switches of the vehicle 60. When it is determined in step S34 that the prohibition conditions have not been established, the routine proceeds to step S35. When it is determined in step S34 that the prohibition conditions have been established, the control routine ends.

Furthermore, in step S38, it is determined whether or not the average value $\theta'$ave of the provisional facial orientation angles (i.e., the provisional pitch angle $\theta x'$, the provisional yaw angle $\theta y'$, and the provisional roll angle $\theta z'$), which have been acquired a plurality of times in step S35, is within the reference angle range ($\theta'_1$ to $\theta'_2$), which is set in advance. Specifically, it is determined whether or not, for example, the average value of the provisional pitch angles $\theta x'$ is within the reference angle range between the first provisional pitch angle $\theta x'_1$ and the second provisional pitch angle $\theta x'_2$. When it is determined in step S38 that the average value $\theta'$ave of the provisional facial orientation angles is not within the reference angle range, which is set in advance, the control routine ends. Conversely, when it is determined that the average value $\theta'$ave of the provisional facial orientation angles is within the reference angle range, which is set in advance, the routine proceeds to step S39 and the setting of the zero-point is performed.

REFERENCE SIGNS LIST 1. driver monitoring system
11. driver monitoring camera
12. vehicle velocity sensor
13. seat pressure sensor
20. surrounding environment detection device
31. GPS receiver
32. map database
40. HMI
50. ECU
51. facial orientation recognition unit
52. zero-point setting unit
53. state diagnosis unit
54. road condition detection unit
55. driver change detection unit
60. vehicle

The invention claimed is:

1. A driver monitoring system comprising an image capturing device for capturing a face image of a driver and a controller to which the face image captured by the image capturing device is transmitted, wherein the controller is configured to:
    recognize a facial orientation angle of the driver based on the face image captured by the image capturing device;
    set a zero-point of the facial orientation angle including at least one of a pitch angle, a yaw angle, and a roll angle of a face of the driver, based on the face orientation angle of the driver recognized by the controller, when zero-point setting conditions, including that a speed of a vehicle is higher than a predetermined speed faster than zero, are established; and
    diagnose a state of the driver based on a current facial orientation angle with respect to the zero-point set by the controller.

2. The driver monitoring system according to claim 1, wherein the zero-point setting conditions include that the setting of the zero-point of the facial orientation angle has not yet been performed after the ignition of the vehicle has been turned on.

3. The driver monitoring system according to claim 1, wherein the zero-point setting conditions include that a predetermined time has elapsed or the vehicle has traveled a predetermined distance since setting of the zero-point of the facial orientation angle has been last performed.

4. The driver monitoring system according to claim 1, the controller is configured to detect a posture of the driver or a change in the driver, wherein
    the zero-point setting conditions include that the controller detects that the posture of the driver has changed or that the driver has changed.

5. The driver monitoring system according to claim 1, the controller is configured to detect condition of a road on which the vehicle is travelling, wherein the controller sets a zero-point of a pitch angle of the face of the driver, and the zero-point setting conditions include that the controller detects that the vehicle is travelling on a road having no inclination.

6. The driver monitoring system according to claim 1, wherein the controller is configured to detect the condition of a road on which the vehicle is travelling, wherein the controller sets a zero-point of a yaw angle of the face of the driver, and the zero-point setting conditions include that the controller detects that the vehicle is travelling on a straight road.

* * * * *